United States Patent [19]

Kroiss

[11] 4,371,960
[45] Feb. 1, 1983

[54] MEASUREMENT OF DISC SERVO HEAD/DATA HEAD MISALIGNMENT

[75] Inventor: Gerald C. Kroiss, Minneapolis, Minn.

[73] Assignee: Magnetic Peripherals Inc., Minneapolis, Minn.

[21] Appl. No.: 219,709

[22] Filed: Dec. 24, 1980

[51] Int. Cl.³ ............................................. G11B 21/10
[52] U.S. Cl. .......................................... 369/43; 360/77
[58] Field of Search ...................... 369/43; 360/77, 78, 360/97–99; 318/632

[56] References Cited

U.S. PATENT DOCUMENTS 3,994,016 11/1976 Moghodon .......................... 360/77
4,135,217 1/1979 Jacques ............................. 360/77

OTHER PUBLICATIONS

"Correction of Data Track Misregistration in Servo Controlled Disk Files", by Paton, IBM Tech. Disc. Bull., vol. 17, No. 6, Nov. 1974.

Primary Examiner—Alan Faber
Attorney, Agent, or Firm—Edward P. Heller, III; Joseph A. Genovese

[57] ABSTRACT

Compensation for radial misalignment between a data head and a servo head is provided. At least one pair of servo data tracks having a servo null there between are written on each data surface. The servo head is moved to a corresponding servo track null and the offset of the data head from its servo track null is measured iteratively by injecting voltages generated by a digital-to-analog converter into the servo head servo loop to progressively decrease the offset of the data head from its servo null until the data head is positioned over the servo null. The digital value of the digital-to-analog converter input is then stored in a digital memory for later use in fine positioning of the data head over a data track by means of retrieving the digital value from memory, converting it to a voltage through the digital-to-analog converter and injecting it into the servo head servo loop.

4 Claims, 3 Drawing Figures

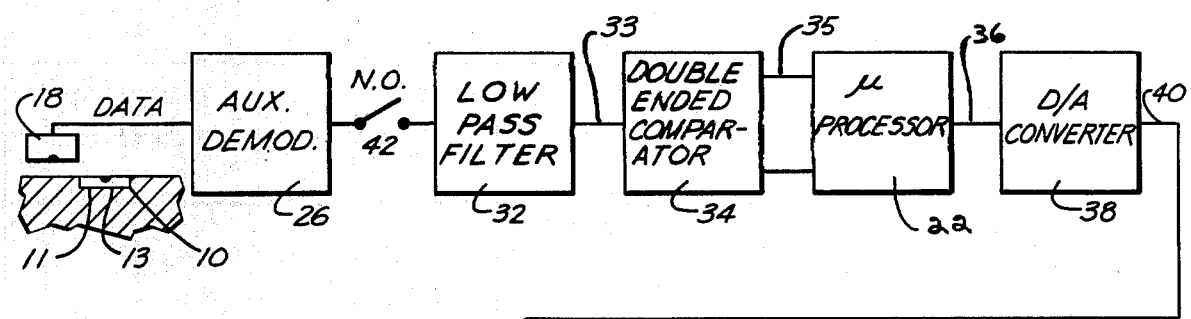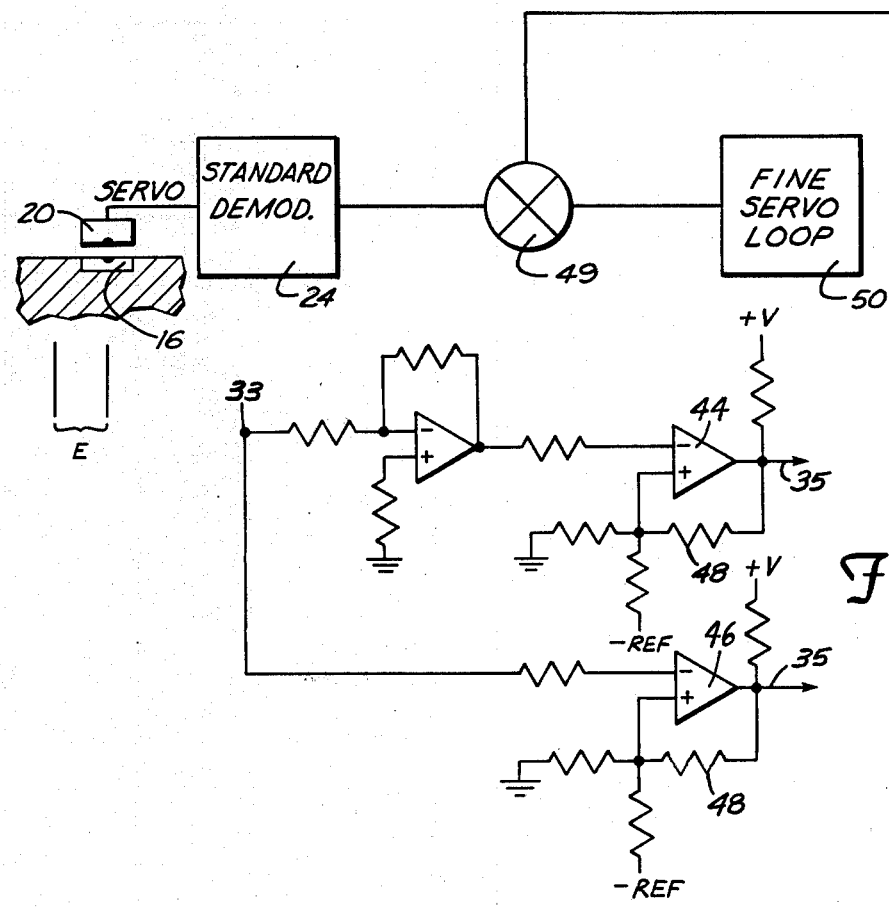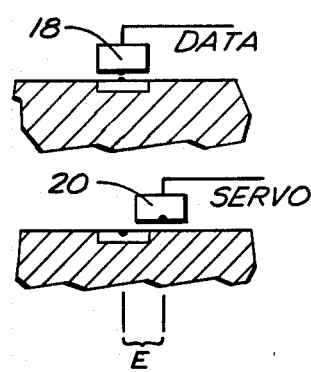

MEASUREMENT OF DISC SERVO HEAD/DATA HEAD MISALIGNMENT

BACKGROUND OF THE INVENTION

1. Field of the Invention

The invention relates generally to the field of data processing and more particularly to servo systems for centering a disc drive's read/write head on a track.

2. Brief Description of the Prior Art

In disc drives having a dedicated servo surface and a plurality of data surfaces wherein the data heads are mounted on the same carriage as the servo head in vertical alignment therewith, it has been proposed that any radial offset of a data head from a servo head be electronically measured and later compensated for when positioning a data head over a data track. See IBM Technical Disclosure Bulletin, Vol. 17, No. 6, Page 1781, November 1974.

In the IBM technical disclosure, one or more servo tracks are written on a data surface. During a calibration procedure the servo head is served to a corresponding servo track on the servo surface. A voltage representative of the radial offset of the data head from its servo track center (null) is then developed in the same manner as the servo head position error signal is developed. The resulting error signal is converted from an analog voltage into a digital value and stored in a digital memory. Thereafter, when positioning the data head over the data track, the servo head is positioned off center from its own servo track center (null) by the theoretical amount of the radial offset measured in the calibration procedure such that the data head is positioned directly over its data track center. This is accomplished by retrieving the digital value from memory, converting it back into a voltage and injecting this voltage into the servo loop of the servo head.

A problem with this approach is that the analog voltage developed by the position error measurement system from the data head may not be representative of the same offset as a similar voltage developed by the servo head position error measurement system. That is, the same voltage from the two positioned error measurement systems might actually be representative of two different offsets. The cause of this might be due to many factors including differing gains in the two sets of circuits. But as a result, injection of the offset voltage measured from the data head into the servo head servo loop may produce a different offset from that desired. The data head will then not be centered on its data track as desired.

SUMMARY OF THE INVENTION

The above problem is overcome in the present invention by essentially reversing the head from which the error measurement is made. When the data head is servoed to its servo track center (null), the servo head will be offset from its servo track center (null) by the amount of the radial misalignment between the two heads. The position error signal developed from the servo head will be representative of this radial misalignment. This position error signal is in the form of a voltage which may then be converted by an analog-to-digital conversion technique into a digital value and stored in a digital memory for later use in fine positioning the data head over a data track. As the offset will be measured from the servo head and the position error measurement system associated therewith, there will be no gain differential error when the offset voltage is injected back into the servo head servo loop.

In the preferred embodiment, the invention employs a double-ended comparator in an iterative process controlled by a microprocessor to eliminate the need for a conventional analog-to-digital converter in measuring the offset voltage. This approach initially positions the servo head over its servo track center (null) and takes the position error signal developed from the data head and introduces it into a double-ended comparator. A microprocessor inspects the state of the double-ended comparator and depending on the results places an appropriately signed predetermined digital value into a digital-to-analog converter, the output of which is injected into the servo loop of the servo head. This voltage moves the servo head away from its servo track center (null) and simultaneously moves the data head towards its servo track center (null). After a time, the double-ended comparator is again inspected and a new voltage is developed by the microprocessor until the double-ended comparator indicates that the data head is over its own servo track center (null). The digital value which produces this result is stored by the microprocessor into memory for later use in positioning the data head over a data track.

BRIEF DESCRIPTION OF THE DRAWINGS

FIG. 1 is a block diagram of an offset measurement technique according to the present invention;

FIG. 2 is a schematic of the double-ended comparator of FIG. 1; and

FIG. 3 shows the relative positions to which the servo and data heads are servoed from an initial position as shown in FIG. 1.

DESCRIPTION OF THE PREFERRED EMBODIMENT

FIG. 1 illustrates a block diagram of a preferred means for implementing the present invention. In this regard, at least one pair of servo data tracks are prerecorded on a portion of a data surface. A cross section of such a pair is shown as 10 in FIG. 1. A corresponding servo track 16 is prerecorded on the servo surface in nominal vertical alignment with the data surface servo track.

Each pair of servo data tracks 10, 16 is conventionally composed of a pattern of a first type written on one track 11 and a second pattern written on the other 13. A read head, such as 18 or 20, reads the entire width of a track at once. If it is centered between the pair of servo tracks, each adjacent track will be read with equal amplitude. If it is more over one track than the other, such as with head 18, one track will be read at a greater amplitude than the other. The difference in amplitude is used as an error signal in a servo loop to servo the head toward track center, as is known in the art. The point between the tracks where the amplitudes are read equally is at the center of a data track and is referred to in the art as a servo null and sometimes as a servo track center.

The data surface read/write head 18 and the servo head 20 are mounted on the same carriage (not shown) and are aligned vertically to close tolerances. However, some misalignment, such as radial offset "E", inevitably remains. Such misalignment is a major limiter on increased track densities.

The apparatus illustrated in FIG. 1 measures the radial offset "E" in the following manner: the standard demodulator 24 is connected to the fine servo loop 50 and receives servo data from servo head 20. The function of a demodulator, as is known, is to convert the raw servo data read from the disk into a position error signal, which is essentially the difference in amplitude between the signals read from adjacent servo track's. The auxiliary demodulator 26, which is connected to the data head, is connected during calibration to low pass filter 32 by closing normally open switch 42.

After coarse positioning, the connection of the servo head 20 into the fine servo loop 50 causes the servoing of the servo head to the center (null) of its servo track 16. This results in the data head 18 being physically offset from its servo track 16. This results in the data head 18 being physically offset from its servo track center by the amount of radial misalignment, "E", between it and the servo head 20. The auxiliary demodulator 26 now outputs a voltage representative of this offset.

This voltage is input to low pass filter 32. The output 33 of the low pass filter 32 is virtually dc and slowly varying. This output 33 is fed into a double-ended comparator 34, such as the one shown in FIG. 2.

The top comparator 44 of FIG. 2 has a "1" output if the input voltage lies above +ref., and a zero below. The bottom comparator 46 has a "1" output below −ref. and a zero above. Feedback resistors 48 are added to avoid "toggle".

The effect of the double-ended comparator is to change state from a "1" to zero when the input voltage falls into a range from −ref. to +ref. The reference range may be chosen to accomodate the accuracy limits desired.

The outputs 35 of the double-ended comparator 34 are provided as inputs to microprocessor 22.

Microprocessor 22 has output lines (eight in the preferred embodiment), represented by line 36, into digital-to-analog converter (DAC) 38. The DAC 38 converts the digital value on lines 38 into a dc voltage on line 40. Line 40 is provided as one input to the fine servo loop 50 through summing junction 49. The other input to the fine servo loop 50 is from the standard demodulator 24. These two combined inputs together form a position error signal in the fine servo loop 50 which servos the carriage and thereby the heads mounted thereon, as known in the art.

In operation, the microprocessor 22 inspects the inputs on line 35 from the double-ended comparator 34 to determine the sign of the voltage error signal from the auxiliary demodulator 24. Depending on this sign, it places an appropriately signed, predetermined value on the output lines 36 and waits. This value is converted into a voltage by DAC 38 and fed into the fine servo loop 50. This voltage causes the fine servo loop to move the carriage such that the date head offset "E" is reduced. Likewise, the servo head 20 is moved a corresponding distance away from its servo through center. Movement is stopped and circuit balance is restored when the standard demodulator 24 is outputting a voltage equal and opposite to the voltage being output by DAC 38.

After a period of time sufficient to allow the heads time to move to the equilibrium position and the low pass filter 32 time to change to the new voltage, microprocessor 22 again inspects lines 35. If their state is unchanged, it increases the value on output lines 36. If their state has reversed, the value is reduced. And, if their state is zero, the process is complete. The data head 18 would then be approximately above its servo track center and the servo head 20 offset a distance "E" as shown in FIG. 3. The value on the output lines 36 is a digital representation of the inverse of the error signal for the offset "E" then being output by the standard demodulator 24. This value is stored into memory by the microprocessor 22 for future reference. When the standard demodulator 24 is again used to position the data lead 18 over a data track center, injection of this value into the fine servo loop via DAC 38 and summing junction 49 will cause the servo head 20 to move away from its servo track center by approximately the offset "E". The data head 18 then will be approximately over data track center.

Other methods of measuring the offset error due to misalignment may occur to those skilled in the art. For example, the outputs of the auxiliary and the standard demodulator may be swapped in FIG. 1 during calibration. The error signal from the servo head could then be input to an analog-to-digital converter (not shown) substituted for the double-ended comparator of FIG. 1. The analog-to-digital converter would directly convert the offset voltage from the servo head into a digital value for storage in memory in lieu of the iterative process discussed above.

Such alternate methods are deemed to be within the scope of the present invention in which I claim:

1. In a method of compensating for radial offset between a disk drive's servo head and a data head wherein at least one track of data surface servo data is written on a data surface and at least one track of servo surface servo data is written on a servo surface in vertical alignment with said data surface servo data, an auxiliary demodulator is connected with the data head to develop a position error signal from said data surface servo data and a standard demodulator is connected with the servo head in a servo loop for developing a position error signal from said at least one track of servo surface servo data, the improvement comprising:

A. measuring the position error signal due to the radial offset between the servo head and the data head as developed by the standard demodulator connected to the servo head;

B. converting this signal into a digital value; and

C. storing it in a digital memory for later compensating for said radial offset in fine positioning of a data head over a data track center by retrieving said digital value from memory, converting it to a voltage via a digital-to-analog converter and injecting said voltage into the servo loop.

2. The improvement of claim 1 wherein the measuring of said position error signal due to said offset comprises:

D. servoing said servo head toward its servo track center (null);

E. inspecting the error signal from the auxiliary demodulator connected to the data head to determine if said signal is approximately zero;

F. injecting a voltage into the servo loop to offset said servo head from its servo track center and to reduce the magnitude of the error signal from said auxiliary demodulator; and G. repeating Steps E and F until the error signal from said auxiliary demodulator is reduced to approximately zero.

3. The improvement of claim 2 wherein Step B includes inputting a digital value into a digital-to-analog converter, the output of which is connected into the servo loop; and wherein the digital value which causes the error signal from the auxiliary demodulator to be reduced to zero comprises the digital value of the position error signal due to said offset as developed by the standard demodulator connected to the servo head.

4. The improvement of claim 1 wherein Steps A and B comprise:
H. servoing the data head over its servo track center; and
I. inputting the error signal from the standard demodulator connected to the servo head into an analog-to-digital converter, the output of which comprises the digital value of the position error signal due to said radial offset.

* * * * *